Aug. 30, 1932.   W. A. SPRIGGS   1,875,183
ENDLESS CONVEYER
Filed Nov. 7, 1929   2 Sheets-Sheet 1
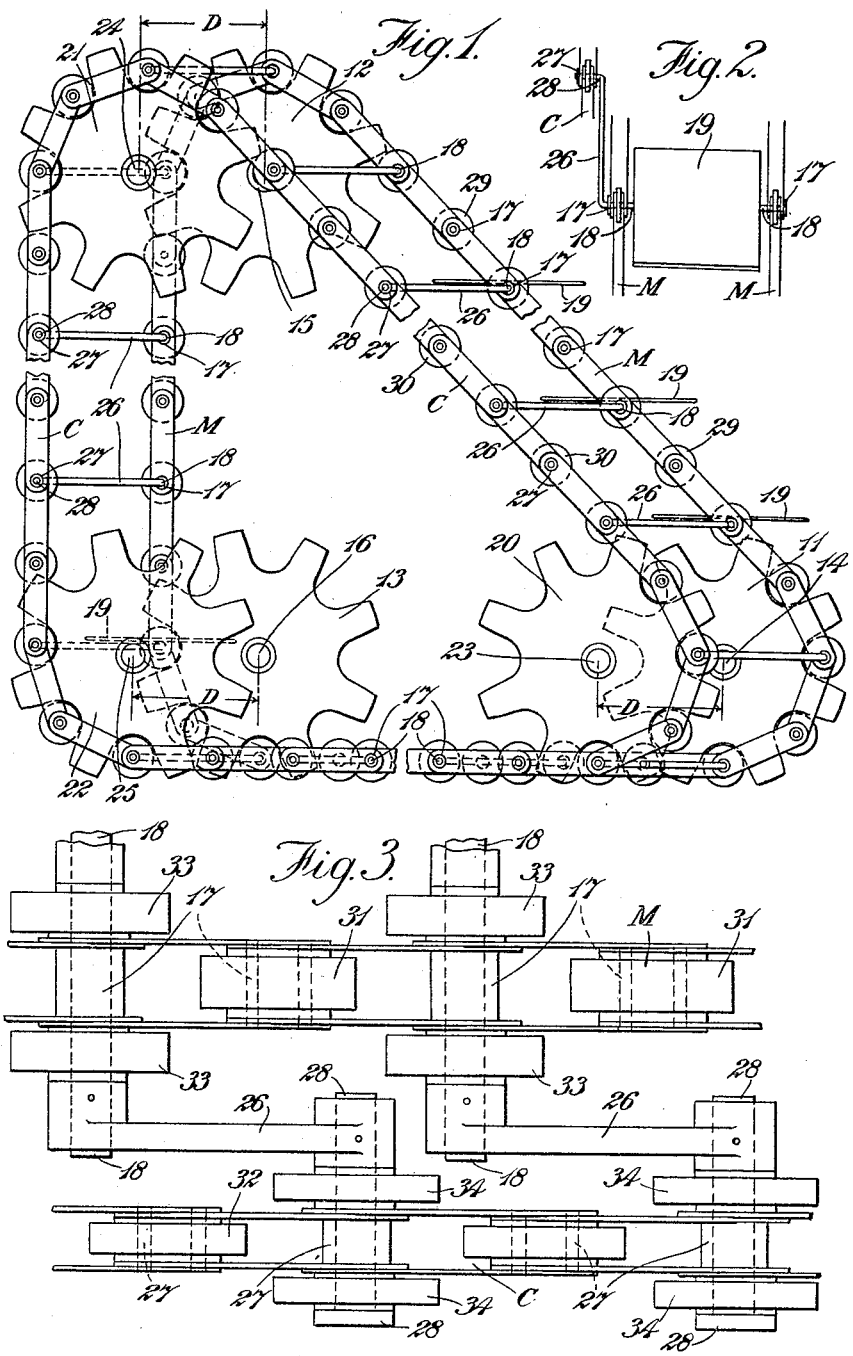
INVENTOR
W. A. SPRIGGS Aug. 30, 1932.  W. A. SPRIGGS  1,875,183
ENDLESS CONVEYER
Filed Nov. 7, 1929  2 Sheets-Sheet 2
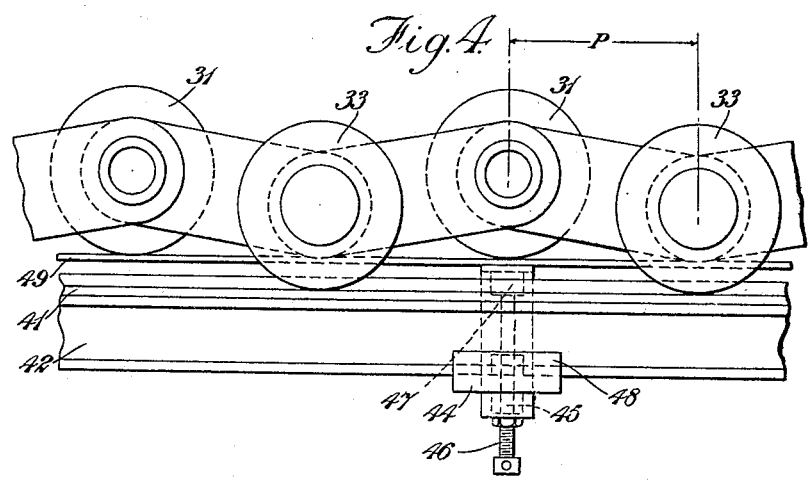
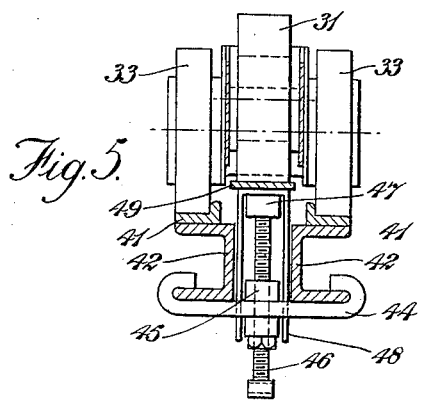
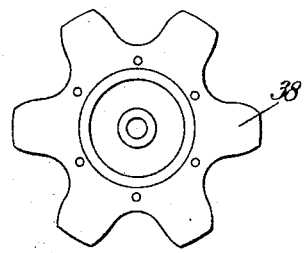 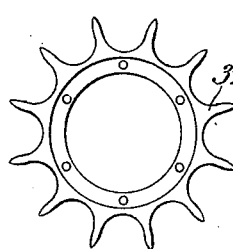 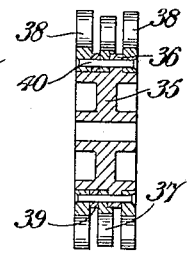
INVENTOR
W. A. SPRIGGS Patented Aug. 30, 1932

1,875,183

UNITED STATES PATENT OFFICE

WALTER ALFRED SPRIGGS, OF SOUTHSEA, ENGLAND

ENDLESS CONVEYER

Application filed November 7, 1929, Serial No. 405,431, and in Great Britain November 21, 1928.

This invention relates to apparatus, such as endless conveyers, escalators and the like, of the kind in which a plurality of similar elements, e. g. vanes, buckets, "stairs" or the like, are adapted to travel in succession around a continuous circuit, and has for its object to provide simple yet effective means whereby the angular relationship of each element of such an apparatus with regard to a given plane extending at right angles to the general plane of the greater part or the whole of said continuous circuit may be controlled or governed, e. g. maintained substantially constant throughout the whole of the travel of said element.

To this end and in accordance with the present invention each element of an apparatus of the kind referred to is pivotally attached to, or connected with, two guide members about two parallel axes, respectively, and said guide members are constrained to travel in continuous paths, respectively extending side by side around the continuous circuit to be traversed by the elements in succession in such manner that throughout the whole of said circuit the distances separating corresponding points in said paths (that is to say points therein which correspond with the two guide members respectively of an element) are substantially constant in a direction parallel with, and substantially constant also in substantially the same or different directions at right angles to, the pivotal axes of elements at corresponding parts of the continuous circuit, motion being imparted to the elements by means of one or more endless cables or chains to which they are connected at intervals.

The angular relationship of the elements with regard to a given plane as mentioned above may be maintained substantially constant throughout the continuous circuit by so arranging the continuous paths of the guide members that corresponding points therein are separated throughout the whole of said circuit by substantially constant distances all in substantially the same direction at right angles to the pivotal axes of elements at corresponding parts of the continuous circuit.

The guide members of the elements may be constituted by wheels or slide blocks adapted to travel in guides conforming with the continuous paths of said guide members, or by attachments to an endless cable or by hollow bushings of an endless chain. In all cases it is desirable that substantially the whole or the greater part or the weight of each element and substantially the whole or the greater part of any load thereon should be taken or supported at the pivotal axis about which one of the guide members is attached to or connected with said element, and, that motion should be imparted to each element by a force acting at or near and substantially at right angles to, said pivotal axis.

The accompanying diagrammatic drawings illustrate apparatus according to one form of the invention; Figure 1 showing to a small scale and in side elevation the manner in which main and control chains are disposed around their sprocket wheels, Figure 2 being fragmentary view to the same scale showing the manner in which the elements are mounted between two main chains, Figure 3 being a fragmentary view showing to a larger scale the construction of a main chain and an associated control chain, Figures 4 and 5 showing to the same scale, in side elevation and in cross-sectional elevation respectively means for adjusting the effective length or pitch of a chain when wear has taken place, whilst Figures 6, 7 and 8 are detail views showing to a reduced scale the construction of a sprocket wheel for a chain such as those shown in Figure 3.

For the sake of simplicity there is illustrated an apparatus of which the elements are adapted to traverse a triangular continuous circuit. Two endless main roller chains indicated at M are disposed each around three sprocket wheels 11, 12 and 13 (see Figure 1) rotatable about axes 14, 15 and 16, respectively, extending at right angles to the general plane, and at the "corners", of the triangular circuit. All the bushings of the main chains M are hollow as shown at 17, 17 . . . and said chains M which are exactly alike, are interconnected at each link by spindles 18, 18 . . . which are journaled at their ends in opposite bushings 17 of the chains M, and fast upon each spindle 18 is mounted an element 19 of the apparatus. Motion is imparted to the main chains M and thus to the elements 19 . . . through the sprocket wheels 11, 12 and/or 13. It will thus be observed that in this manner a driving force is applied to each element 19 at the axis where the weight thereof is supported, namely at the corresponding spindle 18.

In order that the elements 19 . . . may be maintained in a horizontal position throughout their travel around the continuous circuit a third or control endless roller chain C is disposed parallel with one of the main chains M at that side thereof remote from the other main chain M and around three sprocket wheels 20, 21 and 22, which are rotatable about axes 23, 24 and 25 respectively extending parallel with those of the corresponding sprocket wheels 11, 12 and 13 of the main chains M and spaced therefrom by a predetermined distance D, in the case illustrated, in a horizontal direction. The spindles 18 . . . upon which the elements 19 . . . are mounted extend through and beyond the corresponding bushings 17 . . . of that main chain M which is adjacent to the control chain C and the projecting portion of each of said spindles 18 is bent to form or has attached thereto a crank 26 equal in radial length to the distance D separating the axes 14 and 23, 15 and 24, and 16 and 25 of corresponding sprocket wheels 11 and 20, 12 and 21, and 13 and 22; the terminal portion of each crank 26 extending at right angles thereto parallel with the corresponding spindle 18 and being journalled in a hollow bushing 27 of the control chain C as shown at 28.

It will thus be observed that each element 19 is connected pivotally with two guide members (chain bushings 17 and 27) about two parallel axes (those of the corresponding spindle 18 and terminal portion 28 of the corresponding crank 26) respectively and that, in view of the relative positions of the main and control chains M and C, said members are constrained to move in paths, corresponding points in which are separated throughout the circuit by predetermined distances (D) all in substantially the same direction (horizontal) at right angles to said axes.

It will also be apparent that three ropes or cables could be employed in place of the chains as above described.

The chains or cables may be provided with rollers which run on rails or the like to support the chains or cables between the sprocket or equivalent wheels thereof.

As shown in Figures 1 and 2 the main and control chains M and C are provided at each bushing 17 and 27 with rollers 29 and 30. In practice, however, and as shown in Figure 3, in order to provide means for compensating for wear in the chains, alternate bushings only of each chain are provided with rollers indicated at 31 . . . in the case of a main chain M and at 32 . . . in the case of an associated control chain C. In this arrangement additional outer rollers 33 are provided upon each spindle 18 at opposite sides of the main chain M, corresponding outer rollers 34 being provided upon the terminal portion 28 of each crank 26 at opposite sides of the control chain C. Each crank 26 consists of a link which is fast at one end upon the projecting portion of the corresponding spindle 18, and the terminal portion 28 of each crank 26 is constituted by a headed pin fast in the other end of the crank 26.

Each of the chains shown in Figure 3 runs on sprocket wheels such as that illustrated by Figures 6, 7 and 8 of the drawings. Such a sprocket wheel comprises a central hub portion 35 (Figure 8) formed with a flange 36 and upon which are assembled a central sprocket 37 (Figure 7) and two outer sprockets 38 (Figure 6); a distance piece 39 being disposed between one outer sprocket 38 and the adjacent face of the inner sprocket 37. The three sprockets are secured in position on the hub 35 by means of rivets or bolts indicated at 40; the centre sprocket 37 being adapted to mesh with the bushings 17 . . . and centre rollers 31 . . . of the chain and the outer sprockets 38 with the outer rollers 33 . . . thereof.

The means for adjusting the effective length or pitch of a chain as wear takes place are illustrated in the case of a main chain M by Figures 4 and 5 of the drawings. As shown the outer rollers 33, 33 . . . of the chain run upon two fixed support rails 41, 41 which extend side by side in spaced relationship between successive sprockets of the chain immediately below the latter. These fixed support rails 41, 41 are carried by channel-section girders 42, 42 which extend beneath said rails in correspondingly spaced relationship and are connected at intervals throughout their length by stirrup members of which one only is shown in the drawings at 44 and which embrace the lower flanges of said girders 42, 42 as clearly shown in Figure 5. Each stirrup member 44 carries an internally threaded bushing 45 through which extends upwardly an adjusting screw 46 to support at its upper end a thrust block 47, an inverted "U-shaped" guide member 48 of which the links extend downwardly through slots in the stirrup member 44 and which supports an adjustable support rail 49 extending parallel with and intermediately of the fixed support rails 41, 41 and upon which run the centre rollers 31, 31 . . . of the chain.

The correct pitch of the chain is indicated by the reference letter P in Figure 4 and when the chain is new successive bushing centres will be at this distance apart with all the links straight or in line. When wear takes place, however, this inter-bushing centre distance will increase and in order to compensate for this the adjustable centre support rail 49 is raised as shown in the drawings above the level of the fixed support rails 41, 41 so that alternate bushings of the chain, i. e. those carrying the centre rollers 31 are raised also until said inter-bushing centre distance, measured in the direction of motion of the chain coincides with the correct pitch P thereof.

Apparatus in accordance with the present invention may be used for imparting motion to, or receiving motion from, a fluid, as an oil pump or as a water-motor for example: or again such apparatus may be employed very advantageously for the propulsion of water vessels in which latter case vertically disposed vane or paddle like elements may be caused to travel in a horizontal direction from end to end of a longitudinally extending well or space provided in the bottom of the vessel.

What I claim is:—

1. An endless conveyer including spaced chains mounted for travel in spaced parallel planes and including hollow bushings, spindles mounted in the opposed hollow bushings of the respective chains and traversing the space between the chains, elements secured on the spindles between the chains to thereby constitute with the spindles the sole load support and driver of the connected element, an additional chain offset vertically and horizontally from the plane of the first mentioned chains and including bushings, spindles in the bushings of the additional chain, the paths of travel of the respective chains maintaining all spindles constantly parallel, rigid connections between the spindles of the first mentioned chains and the spindles of the additional chain, the relation of the chains insuring that the elements remain constantly in the same angular position throughout the travel of the chains, the first mentioned chains including rollers concentric to the spindles, rollers intermediate the spindles, a trackway for the first mentioned rollers, an independent trackway for the intermediate rollers, and means for relatively adjusting the latter trackway.

2. An endless conveyer including spaced chains mounted for travel in spaced parallel planes and including hollow bushings, spindles mounted in the opposed hollow bushings of the respective chains and traversing the space between the chains, elements secured on the spindles between the chains to thereby constitute with the spindles the sole load support and driver of the connected elements, an additional chain offset vertically and horizontally from the plane of the first mentioned chains and including bushings, spindles in the bushings of the additional chain, the paths of travel of the respective chains maintaining all spindles constantly parallel, rigid connections between the spindles of the first mentioned chains and the spindles of the additional chain, the relation of the chains insuring that the elements remain constantly in the same angular position throughout the travel of the chains, said first mentioned chains including spaced rollers concentric with the spindles, intermediate rollers, fixed support rails for the concentric rollers, and an adjustable rail for the intermediate rollers whereby through the adjustment of the intermediate rollers corresponding parts of the chain are moved out of the line of travel to shorten the effective length of the chain and maintain its pitch constant irrespective of wear or stretch.

W. A. SPRIGGS.